United States Patent Office 3,826,676
Patented July 30, 1974

3,826,676
WATER VAPOR IMPERMEABLE SAUSAGE CASING MATERIAL
Wilhelm Heling, Bensheim-Auerbach, and Harald Hordt, Weinheim-Bergstrasse, am Drachenstein, Germany, assignors to Firma Carl Freudenberg, Weinheim-Bergstrasse, Germany
No Drawing. Filed Jan. 31, 1972, Ser. No. 222,308
Claims priority, application Germany, Feb. 8, 1971,
P 21 05 715.8
Int. Cl. A22c 13/00
U.S. Cl. 117—76 T                                   10 Claims

ABSTRACT OF THE DISCLOSURE

A sausage casing material comprising an elastically prebonded fibrous skeleton, the pores of which are coated with a non-water-soluble, swellable and shrinkable filler and which is coated with a polyvinylidene chloride foil having a thickness between 10 and 20 microns; the method of preparing such sausage casing material which comprises forming an elastically prebonded fibrous skeleton, containing polyvinyl alcohol fibers, impregnating the same with a non-water-soluble, swellable and shrinkable filler material and coating the same with a polyvinylidene chloride foil having a thickness between 10 and 20 microns.

BACKGROUND OF THE INVENTION

Field of the invention

This invention is directed to a novel water vapor impermeable sausage casing material particularly useful for hot sausages. More particularly, this invention is directed to a novel water vapor impermeable sausage casing material having improved strength and good shrinking characteristics. This invention is also directed to a process for obtaining the same from relatively inexpensive readily available materials. This invention is further directed to a sausage containing meat, said meat encased in a novel sausage casing material which is water vapor impermeable.

Discussion of the prior art

Sausage casing materials from cellophane have long been used. These sausage casing materials swell when contacted with water. In use, the cellophane casings are wetted before filling with meatstuffs. The wet casing swells and is subsequently filled and closed. Thereafter the sausage is boiled in hot water. During this operation the swelling is even increased. When the sausage is removed from the water the casing shrinks and fits tightly to the meat. This is highly desirable since sausage casings which show folds and wrinkles are undesirable, leaving the impression that the sausage itself is old.

Unfortunately, these sausage casings suffer from several serious disadvantages. First of all, their tear strength is extremely low. Once the foil is damaged, the tearing propagates. For this reason, it has become desirable to laminate the cellophane foil with a non-woven fabric to reinforce the same. Unfortunately, such a process is difficult because the fabric will not have the same swelling and shrinking characteristics as the cellophane. While it may be possible to form a laminate of a woven or non-woven fabric onto a cellophane or polyvinylidene chloride foil, the result is that when the same is subjected to the action of heat and moisture, problems begin. The different extensions of the two layers during shrinking and swelling leads to delamination. For this reason, it is not practicable to make a simple lamination in the manner suggested above.

SUMMARY OF THE INVENTION

Broadly, this invention contemplates a sausage casing material comprising an elastically prebonded fiber skeleton, the pores of which are coated with a non-water-soluble, swellable and shrinkable filler and which is coated with a polyvinylidene chloride foil having a thickness between 10 and 20 microns.

This invention further contemplates a method for preparing such a sausage casing material which is water-vapor-impermeable which comprises forming an elastically prebonded fibrous skeleton, filling the pores thereof with a coating of a non-water-soluble, swellable and shrinkable filler, coating the same with a polyvinylidene chloride foil having a thickness between 10 and 20 microns.

In accordance with this invention, it has been found that if one employs a specific type of non-woven fabric as a base for the sausage casing material, a sausage casing material having high tear strength and the desirable swelling and shrinking properties can be provided. The sausage casing material of the instant invention fits tightly around the meatstuffs when the casing is filled with the meat and processed as described above.

In accordance with this invention, a specific type of elastically prebonded fibrous skeleton is employed. This prebonded fibrous skeleton comprises fibers which are held together, but not rigidly, such that when contacted with water the fibers can move with respect to one another to permit the fibrous skeleton to swell. A particularly desirable type of elastically prebonded fibrous skeleton comprises a fibrous fleece containing polyvinyl alcohol fibers in admixture with other synthetic fibers characterized by a high tear strength. The polyvinyl alcohol fibers are present in an amount between 10 and 30% by weight, based upon the entire fibrous content of the fibrous skeleton mass.

Suitable fibers which can be in admixture with polyvinyl alcohol fibers include polyester and polyamide fibers. Of these, there are particularly contemplated fibers obtained from polymers obtained by the ester interchange of a phthalic acid and a diol, for example, ethylene glycol, polyepsilon caproamide (Nylon 6) and polyhexamethylene-adipamide (Nylon 6/6). Other polyamides and polyesters are also contemplated. These polyesters or polyamides are characterized by a high tear strength.

In accordance with this invention there is disposed within the prebonded fibrous fleece a filler. The filler is one which is non-water-soluble and which swells and shrinks. Suitable filler materials for use in the present invention include cellulose, carboxymethyl cellulose, hydroxyethyl cellulose or collagen in a non-water-soluble form. It is important that these materials swell and shrink together with the elastically prebonded fibrous fleece so as to constitute a unitary sausage casing material which will give a tight fit around the meatstuffs and give the appearance of fresh sausage.

In a preferred mode of the present invention, a xanthogenate solution is used, whereby cellulose is deposited within the interstices of the fibrous mat. The sodium xanthogenate impregnates the prebonded elastic fibrous skeleton. After impregnation, the cellulose is regenerated from the solution by contacting the so impregnated fibrous fleece with an acid, suitably sulfuric acid. This can suitably be done by immersing the xanthogenate-impregnated fibrous fleece into a vat containing sulfuric acid. Thereafter the same is washed free of acid and it is ready for treatment whereby the polyvinylidene chloride foil is placed or laminated onto the prebonded elastic, fibrous fleece material containing the filler.

The use of polyvinyl alcohol fibers in accordance with the present invention represents a preferred mode of carrying out the invention. These polyvinyl alcohol fibers are rendered tacky when subjected to water. Hence, the bond created within the fibrous fleece is such as to allow the fibrous fleece some elastic properties. This is of critical importance in the present invention. Other fibers for the elastically prebonded fibrous skeleton include fibers which form spin-bonded fleece, as disclosed in U.S. 3,502,763. Solvent-bonded fleeces are also contemplated. These include fibrous masses treated with a partial solvent of one of the fibers, e.g., acetone, which renders one fiber sticky so that it adheres to another.

The wetting of polyvinyl alcohol fibers makes the bonding points of the fibers weaker. Thus, the fleece can be stretched for a certain degree of elongation. Drying of the fleece shrinks the same. Thus, the fibrous fleece containing the polyvinyl alcohol has much the same characteristics as the prior art cellophane foil. Unfortunately, it cannot be combined with a cellulose layer because the nonwoven fabric, being an extremely voluminous structure, presents few contact points to facilitate the lamination.

Preferred methods for application of the xanthogenate solution include utilization of a doctor knife which moves the xanthogenate solution into the interior of the fleece. The fleece so treated has good bonding characteristics. Additionally, the xanthogenate solution can be applied to the fleece by immersing the fleece into a solution of the xanthogenate.

The resultant so treated fleece is subsequently trated with an acid to convert or precipitate the xanthogenate therefrom. In such a step a suitable acid, especially a dilute mineral acid, is employed. Particularly contemplated acids include dilute sulfuric acid, dilute hydrochloric acid, and dilute phosphoric acid. The fleece is then treated with water to wash the fleece free of acid and any residual xanthogenate.

The so acid-treated and washed fleece is dried in an oven until a unitary structure is provided. Thereafter, it can be rendered smooth by calendering as between a pair of rollers.

The fibrous fleece so formed is capable of assuming definite shapes when treated on at least one side thereof with polyvinylidene chloride solution. The polyvinylidene chloride solution enables the resultant sausage casing material to have properties whereby it can be wound up on rolls or glued together with binding agents. The polyvinylidene chloride need only be applied to one side of the fibrous fleece material. It is suitably applied in the form of a solution, particularly a solution wherein the polyvinylidene chloride is present in an amount between 10 and 30% by weight.

The xanthogenate solution is preferably an aqueous xanthogenate solution wherein the xanthogenate is present in an amount between 2 and 12% by weight, preferably between 6 and 10% by weight. Suitable xanthogenates for use in such a solution include the sodium xanthogenate and the potassium xanthogenate.

The xanthogenate solution is applied to the fibrous fleece material such that the interstices between the fibers are substantially filled or impregnated with the xanthogenate solution. For this purpose, an amount of xanthogenate solution between about 5 and 15%, based upon the weight of the fibrous fleece can be used. Preferably, the amount of xanthogenate solid is between 50 and 150% based upon the weight of the fibrous fleece. Most suitably, a ratio of fiber to xanthogenate of about 1:1 in the so-treated product is used. It will be realized that the amount of xanthogenate solution employed to treat the fibrous fleece will vary, depending upon the concentration of the xanthogenate in the solution.

After the fibrous fleece has been contacted with the xanthogenate solution and the same has either coated or impregnated the prestabilized fleece, the fleece containing the xanthogenate is treated with a dilute acid as above specified. The amount of acid utilized will generally be determined by the extent of the impregnation of the xanthogenate and the normality of the acid solution employed. The acid treatment effects conversion or regeneration of the xanthogenate in the fleece, leaving a material which can be mechanically handled and has added weight. The so-acid-treated material is washed free of acid and dried in an oven. The fleece can thereafter be calendered to render the same smooth. Preferably, it has a thickness between $40\mu$ and $200\mu$, after calendering.

When so dried, the fibrous fleece is coated with a solution of polyvinylidene chloride. The polyvinylidene chloride can be added to the fibrous fleece in the form of a solution. Solvents of the polyvinylidene chloride which can be employed for the present purposes include tetrahydrofuran.

The polyvinylidene chloride can be present in its solvent in an amount between 10 and 30 weight percent. The polyvinylidene chloride can also be present in the form of a dispersion. In this case the solids content is preferably about 55%. The same can be applied by a brush or can be sprayed onto the waiting fibrous fleece. It is applied in an amount between 5 and 35, preferably between 12 and 16 grams per square meter of fibrous fleece. The resultant water-vapor-impermeable sausage casing has a thickness between 10 and 20 microns.

In accordance with this invention, there is used the polyvinyl alcohol fibers which insure that the regeneration of the xanthogenate by the acid treatment does not provide any problems. Hence, the removal of the xanthogenate corresponds with, in time, shrinking of the fibrous fleece.

In order to more fully illustrate the nature of the invention and the manner of practicing the same, the following example is presented.

EXAMPLE

A fibrous fleece of synthetic fibers weighing 40 grams per square meter was prepared. The fibers employed comprised a mixture of 80 parts by weight polyester fibers and 20 parts by weight of water soluble polyvinyl alcohol fibers. The staple length of the polyester fibers varied between 6 and 20 mm. The fleece was prepared on a hydroformer. The hydroformer consisted of a conveyor screen onto which a fiber slurry was poured. Suction chambers were positioned between the screen to de-water the fibrous fleece. The specific hydroformer is utilized by paper-makers and is sold by the German firm of Voith, in Heidenheim.

The so-prepared fleece was placed onto a felt covered drum drier where it was dried and stabilized. The stabilization was effected when the polyvinyl alcohol fibers became dry. The so-dried and stabilized fibers were run over auxiliary rollers into a bath containing an 8 percent by weight xanthogenate solution. After having been passed through the bath, the fleece was squeezed free of excess xanthogenate solution by being passed through rubber quenching rollers. The resultant fleece had a moisture content of about 1040% by weight.

The xanthogenate-fibrous fleece was passed into a vat containing a 10% by weight solution of sulfuric acid. This acid treatment effectuated deposit of substantially all of the xanthogenate present in the fibrous fleece. The fleece was withdrawn from the sulfuric acid containing vat and washed with water until it was acid free. Thereafter, it was dried at 110° C. and calendered on rollers until it had a smooth surface.

The weight of the fleece was increased to 80 grams per square meter. A 20% by weight solution of polyvinylidene chloride solution in tetrahydrofuran was applied to the pretreated fleece with an air brush. The weight of the polyvinylidene chloride coating on the fleece amounted to 15 grams per square meter. Thereafter, the so-coated or treated fleece was dried and wound up along its width until the long edges touched one another. The edges were glued together utilizing a cyanoacrylic binder. The contact area had a width of about 5 mm.

In accordance with this invention, as above outlined, numerous fibers can be employed. These can have a staple length varying between 4 and 60 mm. Additionally, the fibers of one polymeric composition can have a length different from the polymers of a second polymeric composition.

The wet pick up of the fibrous fleece after it is treated with the xanthogenate solution is not particularly critical. However, if the same is adjusted to a moisture content between 500 and 1600% by weight, suitable sausage casings having water-impermeable characteristics can be prepared. The polyvinylidene chloride is present, pursuant to the present invention, in an amount between 5 and 15% by weight, based upon the weight of the sausage casing material. Generally, in accordance with this invention, when the polyvinylidene chloride is present as a sheet, it has a thickness between 10 and 20 microns.

What is claimed is:

1. A water vapor impermeable sausage casing material comprising an elastically prebonded fiber skeleton comprising polyvinyl alcohol fibers, the pores of which are coated with a non-water-soluble, swellable and shrinkable filler and which is coated with a polyvinylidene chloride foil having a thickness between 10 and 20 microns.

2. A sausage casing material according to Claim 1, wherein the elastically prebonded skeleton comprises polyvinyl alcohol fibers and fibers having high tear strength.

3. A sausage casing material according to Claim 2, wherein said polyvinyl alcohol fibers are present in said elastically prebonded fiber skeleton in an amount between 10 and 30% by weight.

4. A sausage casing material according to Claim 3, wherein the skeleton is a solvent-bonded fleece.

5. A sausage casing material according to Claim 4, wherein said polyvinyl alcohol fibers are in admixture with a polyester fiber or a polyamide fiber.

6. A sausage casing material according to Claim 5, containing cellulose within the pores of the fibrous skeleton.

7. A method for preparing a water vapor impermeable sausage casing material of Claim 1 which comprises forming an elastically prebonded fiber skeleton, impregnating the same with a non-water-soluble, swellable and shrinkable filler, and coating the same with a foil of polyvinylidene chloride having a thickness of between 10 and 20 microns.

8. Method according to Claim 7, wherein said fibrous skeleton comprises between 10 and 30% polyvinyl alcohol fibers which are rendered tacky when subjected to water.

9. Method according to Claim 8, wherein said elastically prebonded fibrous skeleton is treated with a xanthogenate solution and thereafter treated with acid to dispose cellulose within said fibrous skeleton.

10. Method according to Claim 9, wherein the fibrous skeleton is treated with between 5 and 15% by weight xanthogenate solution, based upon the weight of the fibrous skeleton.

References Cited

UNITED STATES PATENTS

| | | | |
|---|---|---|---|
| 3,640,735 | 2/1972 | Oppenheimer et al. | 99—176 |
| 3,679,436 | 7/1972 | Oppenheimer et al. | 99—176 |
| 3,135,613 | 6/1964 | Underwood | 99—176 |
| 3,518,041 | 6/1970 | Brelich | 117—140 A |

FOREIGN PATENTS

| | | | |
|---|---|---|---|
| 1,917,265 | 10/1970 | Germany | 99—176 |

MORRIS O. WOLK, Primary Examiner

S. MARANTZ, Assistant Examiner

U.S. Cl. X.R.

117—140 R; 161—227; 138—118.1; 426—135, 277